United States Patent
Howe et al.

(10) Patent No.: US 10,733,089 B2
(45) Date of Patent: Aug. 4, 2020

(54) APPARATUSES AND METHODS FOR WRITE ADDRESS TRACKING

(71) Applicant: Micron Technology, Inc., Boise, ID (US)

(72) Inventors: Gary L. Howe, Plano, TX (US); Timothy P. Finkbeiner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 182 days.

(21) Appl. No.: 15/215,296

(22) Filed: Jul. 20, 2016

(65) Prior Publication Data
US 2018/0024769 A1    Jan. 25, 2018

(51) Int. Cl.
*G06F 12/02*    (2006.01)

(52) U.S. Cl.
CPC .. *G06F 12/0215* (2013.01); *G06F 2212/1016* (2013.01); *G06F 2212/1028* (2013.01); *Y02D 10/13* (2018.01)

(58) Field of Classification Search
CPC .. G06F 3/0647; G06F 12/0802; G06F 3/0625; G06F 3/0611; G06F 3/0685; G06F 2212/60; G06F 12/0215; G06F 2212/1016; G06F 2212/1028; Y02D 10/13
See application file for complete search history.

(56) References Cited

U.S. PATENT DOCUMENTS

| | | |
|---|---|---|
| 4,380,046 A | 4/1983 | Fung |
| 4,435,792 A | 3/1984 | Bechtolsheim |
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |

(Continued)

FOREIGN PATENT DOCUMENTS

| | | |
|---|---|---|
| CN | 102141905 | 8/2011 |
| EP | 0214718 | 3/1987 |

(Continued)

OTHER PUBLICATIONS

"4.9.3 Minloc and Maxloc", Jun. 12, 1995, (5pgs.), Message Passing Interface Forum 1.1, retrieved from http://www.mpi-forum.org/docs/mpi-1.1/mpi-11-html/node79_html.

(Continued)

*Primary Examiner* — David Yi
*Assistant Examiner* — Alan Otto
(74) *Attorney, Agent, or Firm* — Brooks, Cameron & Huebsch, PLLC (57) ABSTRACT

Apparatuses and methods are provided for write address tracking. An example apparatus can include an array of memory cells and a cache coupled to the array. The example apparatus can include tracking circuitry coupled to the cache. The tracking circuitry can be configured to track write addresses of data written to the cache.

23 Claims, 5 Drawing Sheets

(56) References Cited

U.S. PATENT DOCUMENTS

| | | |
|---|---|---|
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,875,452 A * | 2/1999 | Katayama ............ G11C 7/1018 365/189.05 |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,532,180 B2 * | 3/2003 | Ryan ................... G11C 7/1006 365/195 |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,901,494 B2 * | 5/2005 | Zumkehr ............ G06F 13/4004 711/167 |
| 6,943,579 B1 | 9/2005 | Hazanchuk et al. |
| 6,948,056 B1 | 9/2005 | Roth |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,692,466 B2 | 4/2010 | Ahmadi |
| 7,685,365 B2 | 5/2010 | Rajwar et al. |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Sec |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |
| 9,015,390 B2 | 4/2015 | Klein |
| 9,047,193 B2 | 6/2015 | Lin et al. |
| 9,158,667 B2 * | 10/2015 | Manning ................ G06F 12/00 |
| 9,165,023 B2 | 10/2015 | Moskovich et al. |
| 2001/0007112 A1 | 7/2001 | Porterfield |
| 2001/0008492 A1 | 7/2001 | Higashiho |

(56) References Cited

U.S. PATENT DOCUMENTS

| | | |
|---|---|---|
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0072369 A1* | 4/2006 | Madter ............... G06F 12/0804 365/232 |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0178053 A1 | 7/2008 | Gorman et al. |
| 2008/0215937 A1 | 9/2008 | Dreibelbis et al. |
| 2008/0165601 A1 | 12/2008 | Matick et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134226 A1 | 5/2012 | Chow |
| 2012/0135225 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0111122 A1* | 5/2013 | Song ................... G06F 13/1647 711/105 |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0279466 A1 | 3/2015 | Manning |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1998 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |

(56) References Cited

FOREIGN PATENT DOCUMENTS

| WO | 2013081588 | 6/2013 |
|---|---|---|
| WO | 2013095592 | 6/2013 |

OTHER PUBLICATIONS

Stojmenovic, "Multiplicative Circulant Networks Topological Properties and Communication Algorithms", (25 pgs.), Discrete Applied Mathematics 77 (1997) 281-305.
Boyd et al., "On the General Applicability of Instruction-Set Randomization", Jul.-Sep. 2010, (14 pgs.), vol. 7, Issue 3, IEEE Transactions on Dependable and Secure Computing.
Elliot, et al., "Computational RAM: Implementing Processors in Memory", Jan.-Mar. 1999, (10 pgs.), vol. 16, Issue 1, IEEE Design and Test of Computers Magazine.
Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.
Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.
Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.
Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.
U.S. Appl. No. 13/449,082, entitled, "Methods and Apparatus for Pattern Matching," filed Apr. 17, 2012, (37 pgs.).
U.S. Appl. No. 13/743,686, entitled, "Weighted Search and Compare in a Memory Device," filed Jan. 17, 2013, (25 pgs.).
U.S. Appl. No. 13/774,636, entitled, "Memory As a Programmable Logic Device," filed Feb. 22, 2013, (30 pgs.).
U.S. Appl. No. 13/774,553, entitled, "Neural Network in a Memory Device," filed Feb. 22, 2013, (63 pgs.).
U.S. Appl. No. 13/796,189, entitled, "Performing Complex Arithmetic Functions in a Memory Device," filed Mar. 12, 2013, (23 pgs.).
International Search Report and Written Opinion for PCT Application No. PCT/US2013/043702, dated Sep. 26, 2013, (11 pgs.).
Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.
Pagiamtzis, Kostas, "Content-Addressable Memory Introduction", Jun. 25, 2007, (6 pgs.), retrieved from: http://www.pagiamtzis.com/cam/camintro.
Debnath, Biplob, Bloomflash: Bloom Filter on Flash-Based Storage, 2011 31st Annual Conference on Distributed Computing Systems, Jun. 20-24, 2011, 10 pgs.
Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

* cited by examiner

APPARATUSES AND METHODS FOR WRITE ADDRESS TRACKING

TECHNICAL FIELD

The present disclosure relates generally to semiconductor memory and methods, and more particularly, to apparatuses and methods for write address tracking.

BACKGROUND

Memory devices are typically provided as internal, semiconductor, integrated circuits in computers or other computing systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Computing systems often include a number of processing resources (e.g., one or more processors), which may retrieve and execute instructions and store the results of the executed instructions to a suitable location. A processing resource (e.g., CPU) can comprise a number of functional units such as arithmetic logic unit (ALU) circuitry, floating point unit (FPU) circuitry, and/or a combinatorial logic block, for example, which can be used to execute instructions by performing logical operations such as AND, OR, NOT, NAND, NOR, and XOR, and invert (e.g., inversion) logical operations on data (e.g., one or more operands). For example, functional unit circuitry may be used to perform arithmetic operations such as addition, subtraction, multiplication, and/or division on operands via a number of logical operations.

A number of components in a computing system may be involved in providing instructions to the functional unit circuitry for execution. The instructions may be executed, for instance, by a processing resource such as a controller and/or host processor. Data (e.g., the operands on which the instructions will be executed) may be stored in a memory array that is accessible by the functional unit circuitry. The instructions and/or data may be retrieved from the memory array and sequenced and/or buffered before the functional unit circuitry begins to execute instructions on the data. Furthermore, as different types of operations may be executed in one or multiple clock cycles through the functional unit circuitry, intermediate results of the instructions and/or data may also be sequenced and/or buffered. Data stored in the memory array and/or intermediate results of the instructions may be stored in a memory cache. The memory cache can be used to transfer and/or operate on the stored data. When data located in the cache is operated on, changed, and/or updated, the data may conflict with corresponding data stored in the memory array. In order to update the memory array, an entire cache of data may be written to the memory array in order to correlate the data in the cache to the data in the memory array.

In many instances, the processing resources (e.g., processor and/or associated functional unit circuitry) may be external to the memory array, and data is accessed via a bus between the processing resources and the memory array to execute a set of instructions. Processing performance may be improved in a processor-in-memory (PIM) device, in which a processor may be implemented internal and/or near to a memory (e.g., directly on a same chip as the memory array). A PIM device may save time by reducing and/or eliminating external communications and may also conserve power.

DETAILED DESCRIPTION

An example apparatus includes an array of memory cells and a cache coupled to the array. The example apparatus can include tracking circuitry coupled to the cache. The tracking circuitry can be configured to track write addresses of data written to the cache.

According to various embodiments of the present disclosure, tracking circuitry is configured to track write addresses. For example, data can be written from a memory array to a cache. At least a portion of the data written to the cache can be updated and the data in the cache can be written to the memory array to maintain consistency between the memory array and the cache. Further, a write address associated with the data can be tracked when the write address corresponds to data in a cache that has been updated. For example, when data in a cache associated with a first write address is updated to include a change in that data in the cache, the first write address is tracked as being updated (e.g., a latch corresponding to the first write address may set an indicator bit). In addition, when data in a cache associated with a second write address is not updated, the second write address is indicated as not being updated (e.g., a latch corresponding to the second write address may not have one or more indicator bits set). In previous approaches, in response to a command to transfer data from a cache to a memory array the entire cache may be written to the memory array to maintain consistency of data between them. However, this can involve significant power and/or transfer time to write data (including non-updated data) from the cache to the memory array. Thus, in some embodiments where data in the memory array is written into the cache but not updated, duplicative power and/or additional transfer time may be involved as data that is already consistent will be transferred (e.g., the non-updated data will be written even though the non-updated data has not changed).

In accordance with embodiments of the present disclosure, data may be written to a cache. The data written to the cache can be updated and written back to the memory array. In response to a command to write the data in the cache to the memory array, the data that has been updated and is associated with the first write address can be written to the memory array and data that has not been updated and is associated with the second write address will not be written to the memory array. In this way, power and/or transfer time will be saved by transferring updated data from the cache to the memory array without transferring data that has not been updated.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, "a number of" a particular thing can refer to one or more of such things (e.g., a number of memory arrays can refer to one or more memory arrays). A "plurality of" is intended to refer to more than one of such things.

The figures herein follow a numbering convention in which the first digit or digits correspond to the drawing figure number and the remaining digits identify an element or component in the drawing. Similar elements or components between different figures may be identified by the use of similar digits. For example, 130 may reference element "30" in FIG. 1, and a similar element may be referenced as 230 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
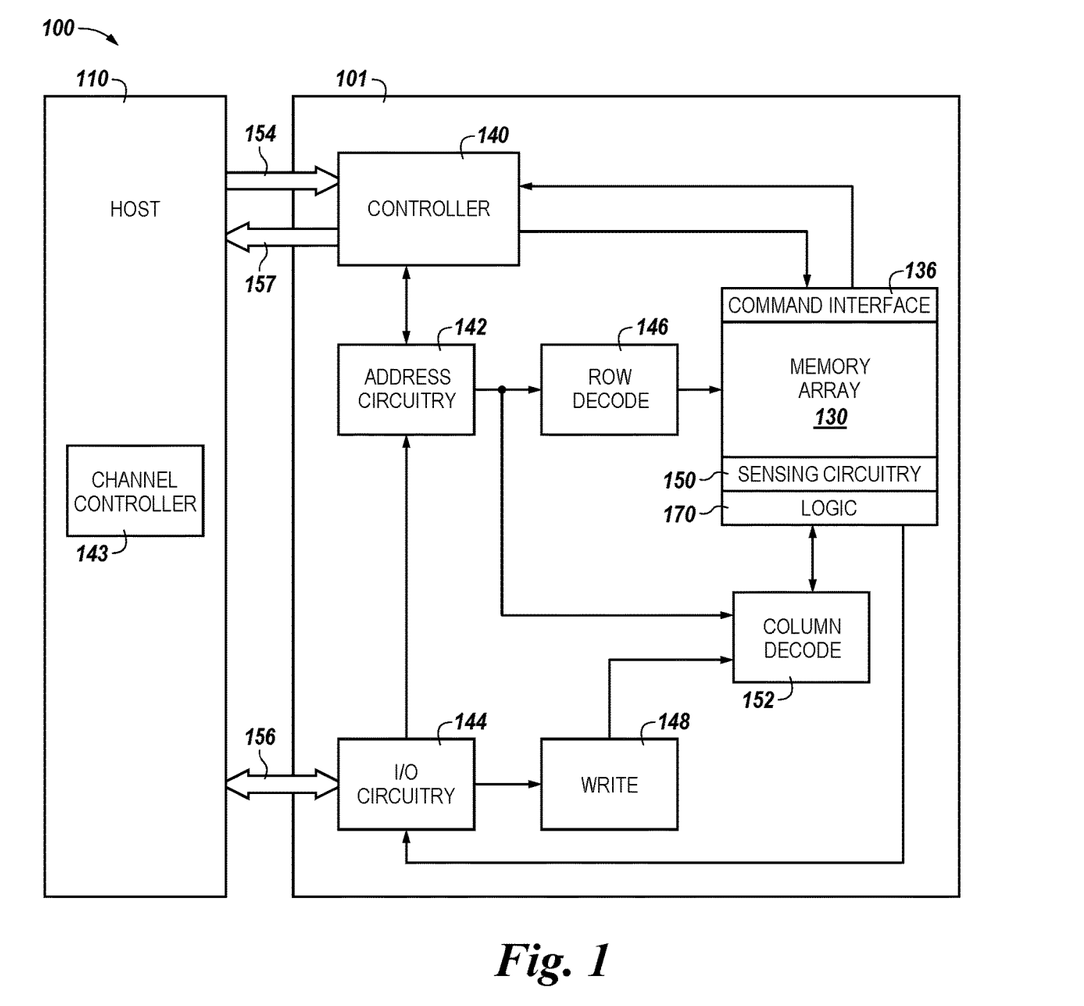
FIG. 1 is a block diagram of an apparatus in the form of a computing system including one example of a processing in memory (PIM) capable device coupled to a host in accordance with the present disclosure.

FIG. 1 is a block diagram of an apparatus in the form of a computing system 100 including one example of a processing in memory (PIM) capable device 101 coupled to a host 110. The PIM capable device 101 (also referred to as "memory device 101") may include a controller 140. FIG. 1 is provided as an example of a system including a current PIM capable device 101 architecture.

As shown in the example of FIG. 1, the memory device 101 may include a memory array 130, a command interface 136, sensing circuitry 150, and additional logic circuitry 170. The system 100 can include separate integrated circuits or both the logic and memory can be on the same integrated device as with a system on a chip (SoC). The system 100 can be, for instance, a server system and/or a high performance computing (HPC) system and/or a portion thereof.

For clarity, the system 100 has been simplified to focus on features with relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines, which may be referred to herein as data lines or digit lines. Although a single array 130 is shown in FIG. 1, embodiments are not so limited. For instance, memory device 101 may include a number of arrays 130 (e.g., a number of banks of DRAM cells, NAND flash cells, etc.).

The memory device 101 includes address circuitry 142 to latch address signals provided over a data bus 156 (e.g., an I/O bus) through I/O circuitry 144. Status and/or exception information can be provided from the controller 140 on the memory device 101 to a host 102 and/or logic resource through an out-of-band bus 157. Address signals are received through address circuitry 142 and decoded by a row decoder 146 and a column decoder 152 to access the memory array 130. Data can be read from memory array 130 by sensing voltage and/or current changes on the data lines using sensing circuitry 150. The sensing circuitry 150 can read and latch a page (e.g., row) of data from the memory array 130. The I/O circuitry 144 can be used for bi-directional data communication with host 110 over the data bus 156. The write circuitry 148 is used to write data to the memory array 130. Address, control and/or commands, e.g., processing in memory (PIM) commands, may be received to the controller 140 via bus 154.

Command interface 136 may include control registers, e.g., double data rate (DDR) control registers in a DRAM, to control the operation of the array 130, e.g., DRAM array, and/or controller 140. As such, the command interface 136 may be coupled to the I/O circuitry 144 and/or controller 140. In various embodiments the command interface 136 may be memory mapped I/O registers. The memory mapped I/O registers can be mapped to a plurality of locations in memory where microcode instructions are stored. However, embodiments are not so limited. For example, any number of memory arrays with a cache between the main array and a host interface can use the command interface 136.

In various embodiments, controller 140 may decode signals received via bus 154 from the host 110. These signals can include chip enable signals, write enable signals, and address latch signals that are used to control operations performed on the memory array 130, including data read, data write, and data erase operations. In one or more embodiments, portions of the controller 140 can be a reduced instruction set computer (RISC) type controller operating on 32 and/or 64 bit length instructions. In various embodiments, the controller 140 is responsible for executing instructions from the host 110 and/or logic components in association with the sensing circuitry 150 to perform logical Boolean operations such as AND, OR, XOR, etc. Further, the controller 140 can control shifting data (e.g., right or left) in an array, e.g., memory array 130. Additionally, portions of the controller 140 can include control logic, a sequencer, timing circuitry and/or some other type of controller, described further in connection with FIG. 2.

Examples of the sensing circuitry 150 and its operations are described further below in connection with FIG. 4. In various embodiments the sensing circuitry 150 can comprise a plurality of sense amplifiers and a plurality of compute components, which may serve as and be referred to herein as an accumulator, and can be used to perform logical operations (e.g., on data associated with complementary data lines).

In various embodiments, the sensing circuitry 150 can be used to perform logical operations using data stored in array 130 as inputs and store the results of the logical operations back to the array 130 without transferring data via a sense line address access (e.g., without firing a column decode signal). As such, various compute functions can be performed using, and within, sensing circuitry 150 rather than (or in association with) being performed by processing resources external to the sensing circuitry (e.g., by a processing resource associated with host 110 and/or other processing circuitry, such as ALU circuitry, located on memory device 101 (e.g., on controller 140 or elsewhere)).

In various previous approaches, data associated with an operand, for instance, would be read from memory via sensing circuitry and provided to external ALU circuitry via I/O lines (e.g., via local I/O lines and/or global I/O lines). The external ALU circuitry could include a number of registers and would perform compute functions using the operands, and the result would be transferred back to the array via the I/O lines. In contrast, in a number of embodiments of the present disclosure, sensing circuitry 150 is configured to perform logical operations on data stored in memory array 130 and store the result back to the memory array 130 without enabling an I/O line (e.g., a local I/O line) coupled to the sensing circuitry 150. The sensing circuitry 150 can be formed on pitch with the memory cells of the array 130. Additional peripheral sense amplifiers, extended row address (XRA) registers, cache and/or data buffering, e.g., additional logic circuitry 170, can be coupled to the sensing circuitry 150 and can be used to store, e.g., cache and/or buffer, results of operations described herein.

Thus, in various embodiments, circuitry external to array 130 and sensing circuitry 150 is not needed to perform compute functions as the sensing circuitry 150 can perform the appropriate logical operations to perform such compute functions without the use of an external processing resource. Therefore, the sensing circuitry 150 may be used to compliment and/or to replace, at least to some extent, such an external processing resource (or at least the bandwidth consumption of such an external processing resource).

However, in a number of embodiments, the sensing circuitry 150 may be used to perform logical operations (e.g., to execute instructions) in addition to logical operations performed by an external processing resource (e.g., on host 110). For instance, processing resources on host 110 and/or sensing circuitry 150 on memory device 101 may be limited to performing only certain logical operations and/or a certain number of logical operations.

Enabling an I/O line can include enabling (e.g., turning on) a transistor having a gate coupled to a decode signal (e.g., a column decode signal) and a source/drain coupled to the I/O line. However, embodiments are not limited to not enabling an I/O line. For instance, in a number of embodiments, the sensing circuitry (e.g., 150) can be used to perform logical operations without enabling column decode lines of the array; however, the local I/O line(s) may be enabled in order to transfer a result to a suitable location other than back to the array 130 (e.g., to an external register).

Figure 2:
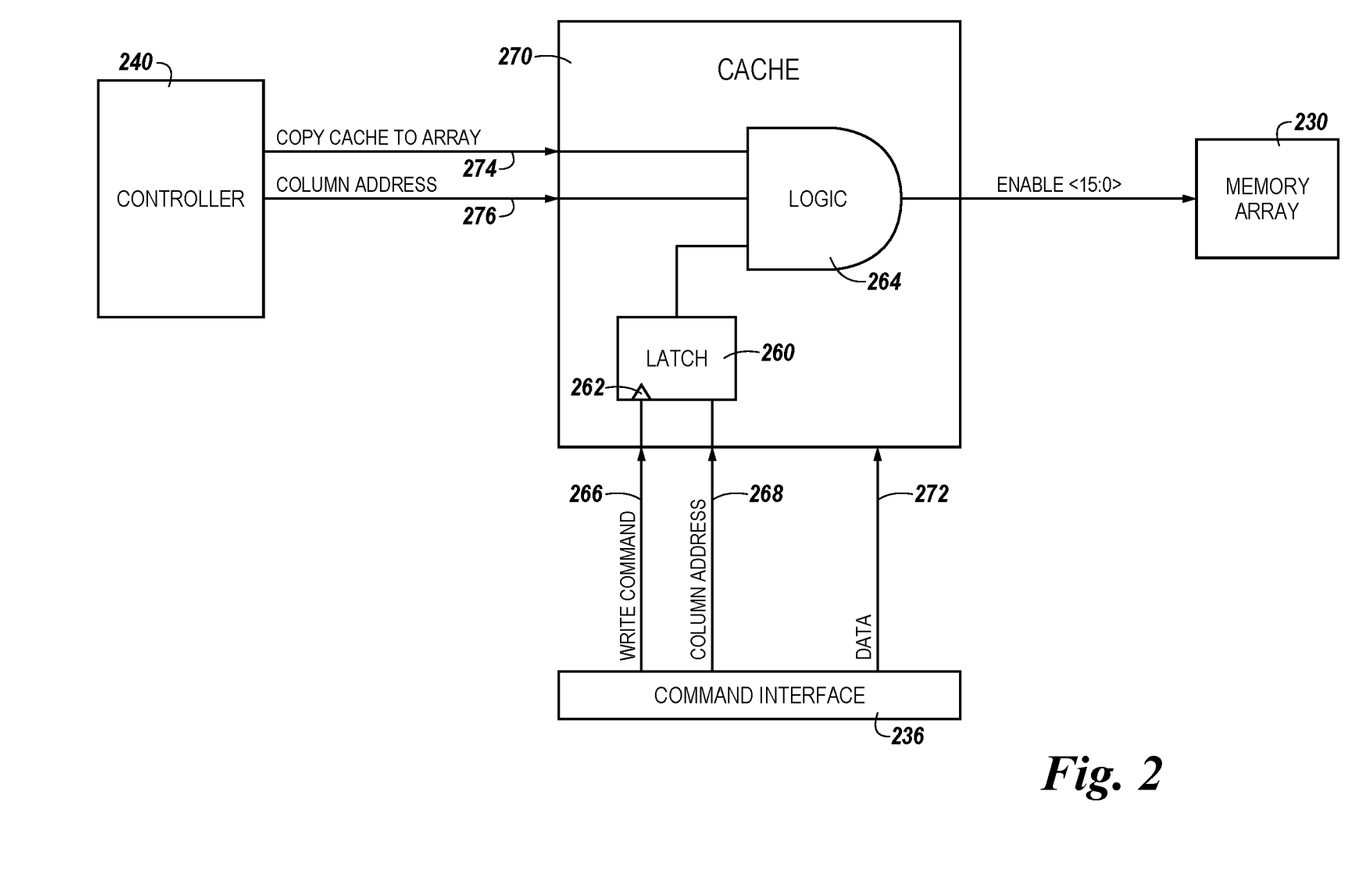
FIG. 2 is a schematic diagram illustrating a system for tracking write addresses in accordance with the present disclosure.

FIG. 2 is a schematic diagram illustrating a system for tracking write addresses in accordance with the present disclosure. The system illustrated in FIG. 2 can include a memory array 230 coupled to a cache 270. The memory array 230 can store data to be processed by the controller 240 and/or additional controllers (not illustrated). The data stored in the memory array 230 can be stored to the cache 270 in a number of memory cells and/or registers. The data stored to the cache 270 can be requested by additional components and/or memory locations (such as memory bank 321-7 in FIG. 3). For example, a memory location (e.g., memory bank 321-7) may request data stored in the memory array 230 that is also stored in the cache 270 for processing. The data can be transferred from the cache 270 to the memory location using a number of I/O lines (e.g., shared I/O line 555 in FIG. 5).

A controller 240 can be coupled to the cache 270. The controller 240 can send a number of indications to the cache 270. A first indication 274 can indicate to copy data in the cache 270 to the memory array 230. A second indication 276 can indicate column addresses 276 associated with data to the cache 270, indicating where the data is stored in the cache 270 and/or in the memory array 230.

A command interface 236 can be coupled to the cache 270. The command interface 236 can be a Double Data Rate (DDR) Synchronous Dynamic Random-Access Memory (SDRAM) command interface. The command interface 236 can send a write command 266 to the cache 270. The write command 266 can be transferred through latch circuitry 260 of the cache 270 and indicate to the latch circuitry that data 272 associated with the write command 266 will be updated. While the tracking circuitry including logic 264 and latch circuitry 260 is illustrated as being a portion of the cache 270, embodiments are not so limited. For example, the logic 264 and/or the latch circuitry 260 can be located outside the cache 270 and can be coupled to and/or in communication with the cache 270.

The latch circuitry 260 can include a latch 262 that corresponds to a particular write address. For example, the command interface 236 can send a write command 266 to write a particular portion of data 272 associated with a particular column address 268. In response to the write command 266 being sent to the latch circuitry 260, the latch 262 can store a particular data value. The latch 262 storing the particular data value can be a set flag that indicates that the portion of data 272 (corresponding to the column address 268) has been updated.

As described herein, in response to a controller sending an indication 274 to copy data in the cache 270 to the memory array 230, portions of the data of the cache 270 that include a set flag in the latch circuitry 260 are written to the memory array. For example, data (e.g., data 272) associated with a latch (e.g., latch 262) that stores a data value indicating the data has been updated and/or written to is written to the memory array 230. Additional portions of the data of the cache 270 that do not include a set flag (e.g., a latch corresponding to each column address of the additional portions includes a data value that indicates the additional portions have not been updated) are not written to the memory array 230. For example, a column address 276 associated with data to be written from the cache 270 to the memory array 230 can be compared, using logic circuitry 264, to a column address 268 associated with data indicated by the command interface 236 to be updated in the cache.

Put another way, the command interface can send write commands 266 to the cache to update a first set of data 272 associated with column addresses 268. In response to the controller 240 indicating, at 274, to write data from the cache 270 associated with indicated column addresses, at 276, to the memory array 230, the first set of data 272 is written to the memory array 230 and a second set of data (not illustrated) is not written to the memory array 230. For example, the controller indicates, at 274, to copy a first set of column addresses (indicated at 276). The first set of column addresses are received by logic circuitry 264 and compared to the column addresses 268 that have entered the latch circuitry 260. In response to a column address at 274 matching a column address 268 that includes a set flag in a corresponding latch 262, the data associated with set flag is written to the memory array. Each of the column addresses indicated at 276 are compared to a corresponding latch 262 and written to the memory array 230 when a corresponding latch 262 includes a set flag and not written to the memory array 230 when the corresponding latch 262 does not include a set flag. This can avoid having to transfer a full cache to the memory array 230 in response to at least a portion of the data in the cache being updated and/or altered.

In some embodiments, the controller 240 can indicate to copy column addresses 276 associated with all data stored in the cache 270. The latch circuitry 260 can track column addresses that correspond to updated data 272. The unwritten and/or non-updated column addresses can be masked such that in response to all column addresses of the cache 270 being selected to be written to the memory array 230, only the column addresses of data that have been updated are written to the memory array 230. Masking can include blocking column select activation lines of the unwritten data of the column addresses and/or disabling write data drivers associated with the unwritten data of the column addresses. For example, array write paths (from the cache 270 to the memory array 230) are enabled for addresses associated with data written (updated) to the cache 270. Array write paths (from the cache 270 to the memory array 230) are masked for addresses associated with data not written (non-updated) to the cache 270. The write address latch circuitry 260 can be cleared in response to a write from the cache 270 to the memory array 230. In this way, transferring of updated data is not duplicated and tracking of write addresses is restarted after each write to the memory array 230 from the cache 270.

In some embodiments, a number of I/O data lines can determine a configuration of the system. For example, a system with 64 I/O lines can use a minimum data size of 512 bits such that eight cycles can be correlated to a 4 k data transfer at a time. In this example, 32 enable bits would be used to store data in a 16 k wide data register. Further, 32 enable bits each corresponding to 512 bits equals 16 k wide data. In an example including a system with 32 I/O lines, a minimum data size of 256 bits can be used with 64 enable bits for a 16 k wide data register. In an example including a system with 16 I/O lines, a minimum data size of 128 bits can be used with 128 enable bits for a 16 k wide data register.

In a number of embodiments, a cache control mode can be used to control reads and writes. For example, a particular word line and a particular column address of the cache 270 can be activated such that an entire cache 270 of data is not transferred.

Figure 3:
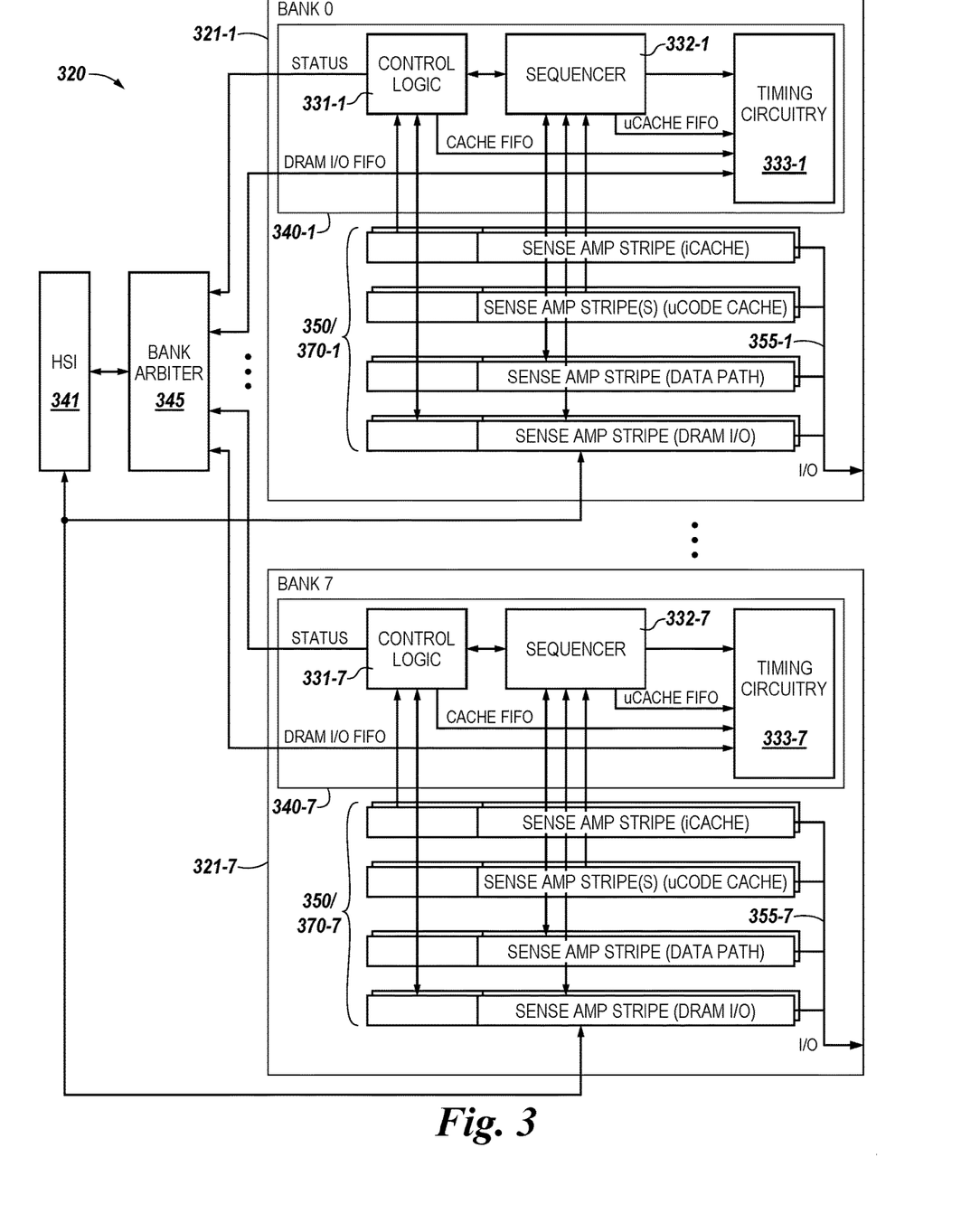
FIG. 3 is a block diagram illustrating a portion of one example of a PIM capable device in greater detail in accordance with the present disclosure.

FIG. 3 is another block diagram in greater detail of a portion of one example of a PIM capable device 320 such as memory device 101 in FIG. 1. In the example of FIG. 3, a controller 340-1, . . . , 340-7 (referred to generally as controller 340) may be associated with each bank 321-1, . . . , 321-7 (referred to generally as 321) to the PIM capable device 320. Eight banks are shown in the example of FIG. 3. However, embodiments are not limited to this example number. Controller 340 may represent controller 140 shown in FIG. 1. Each bank may include one or more arrays of memory cells (not shown). For example each bank may include one or more arrays such as array 130 in FIG. 1 and can include decoders, other circuitry and registers shown in FIG. 1. In the example PIM capable device 320 shown in FIG. 3, controllers 340-1, . . . , 340-7 are shown having control logic 331-1, . . . , 331-7, sequencers 332-1, . . . , 332-7, and timing circuitry 333-1, . . . , 333-7 as part of a controller 340 on one or more memory banks 321 of a memory device 320. The PIM capable device 320 may represent part of memory device 101 shown in FIG. 1.

As shown in the example of FIG. 3, the PIM capable device 320 may include a high speed interface (HSI) 341 to receive data, addresses, control signals, and/or commands at the PIM capable device 320. In various embodiments, the HSI 341 may be coupled to a bank arbiter 345 associated with the PIM capable device 320. The HSI 341 may be configured to receive commands and/or data from a host, e.g., 110 as in FIG. 1. As shown in the example of FIG. 3, the bank arbiter 345 may be coupled to the plurality of banks 321-1, . . . , 321-7.

In the example shown in FIG. 3, the control logic 331-1, . . . , 331-7 may be in the form of a microcoded engine responsible for fetching and executing machine instructions, e.g., microcode instructions, from an array of memory cells, e.g., an array as array 130 in FIG. 1, that is part of each bank 321-1, . . . , 321-7 (not detailed in FIG. 3). The sequencers 332-1, . . . , 332-7 may also be in the form of microcoded engines. Alternatively, the control logic 331-1, . . . , 331-7 may be in the form of a very large instruction word (VLIW) type processing resource and the sequencers 332-1, . . . , 332-7, and the timing circuitry 333-1, . . . , 333-7 may be in the form of state machines and transistor circuitry.

The control logic 331-1, . . . , 331-7 may decode microcode instructions into function calls, e.g., microcode function calls (uCODE), implemented by the sequencers 332-1, . . . , 332-7. The microcode function calls can be the operations that the sequencers 332-1, . . . , 332-7 receive and execute to cause the PIM device 320 to perform particular logical operations using the sensing circuitry such as sensing circuitry 150 in FIG. 1. The timing circuitry 333-1, . . . , 333-7 may provide timing to coordinate performance of the logical operations and be responsible for providing conflict free access to the arrays such as array 130 in FIG. 1.

As described in connection with FIG. 1, the controllers 340-1, . . . , 340-7 may be coupled to sensing circuitry 150 and/or additional logic circuitry 170, including cache, buffers, sense amplifiers, extended row address (XRA) latches, and/or registers 350/370-1, associated with arrays of memory cells via control lines and data paths shown in FIG. 3 as 355-1, 355-7. As such, sensing circuitry 150 and logic 170 shown in FIG. 1 can be associated to the arrays of memory cells 130 using data I/Os shown as 355-1, . . . , 355-7 in FIG. 3. The controllers 340-1, . . . , 340-7 may control regular DRAM operations for the arrays such as a read, write, copy, and/or erase operations, etc. Additionally, however, microcode instructions retrieved and executed by the control logic 331-1, . . . , 331-7 and the microcode function calls received and executed by the sequencers 332-1, . . . , 332-7 cause sensing circuitry 150 shown in FIG. 1 to perform additional logical operations such as addition, multiplication, or, as a more specific example, Boolean operations such as an AND, OR, XOR, etc., which are more complex than regular DRAM read and write operations. Hence, in this PIM capable device 320 example, microcode instruction execution and logic operations are performed on the banks 321-1, . . . , 321-7 to the PIM device 320.

As such, the control logic 331-1, . . . , 331-7, sequencers 332-1, . . . , 332-7, and timing circuitry 333-1, . . . , 333-7 may operate to generate sequences of operation cycles for a DRAM array. In the PIM capable device 320 example, each sequence may be designed to perform operations, such as a Boolean logic operations AND, OR, XOR, etc., which together achieve a specific function. For example, the sequences of operations may repetitively perform a logical operation for a one (1) bit add in order to calculate a multiple bit sum. Each sequence of operations may be fed into a first in/first out (FIFO) buffer coupled to the timing circuitry 333-1, . . . , 333-7 to provide timing coordination with the sensing circuitry 150 and/or additional logic circuitry 170 associated with the array of memory cells 130, e.g., DRAM arrays, shown in FIG. 1.

In the example PIM capable device 320 shown in FIG. 3, the timing circuitry 333-1, . . . , 333-7 provides timing and provides conflict free access to the arrays from four (4) FIFO queues. In this example, one FIFO queue may support array computation, one may be for Instruction fetch, one for microcode (e.g., Ucode) instruction fetch, and one for DRAM I/O. Both the control logic 331-1, . . . , 331-7 and the sequencers 332-1, . . . , 332-7 can generate status information, which is routed back to the bank arbiter 345 via a FIFO interface. The bank arbiter 345 may aggregate this status data and report it back to a host 110 via the HSI 341.

Figure 4:
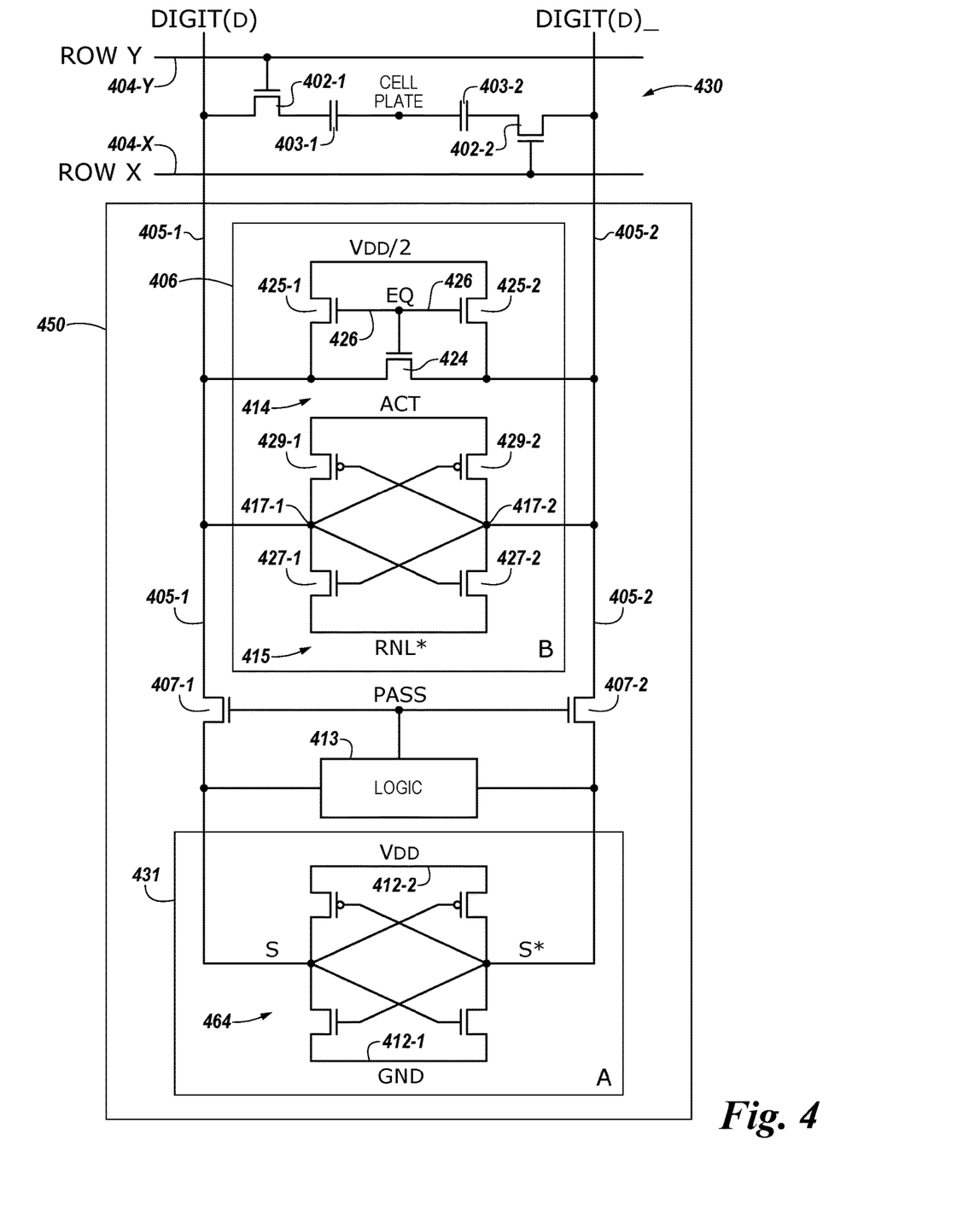
FIG. 4 is a schematic diagram illustrating sensing circuitry of a memory device in accordance with a number of embodiments of the present disclosure.

FIG. 4 is a schematic diagram illustrating sensing circuitry 450 in accordance with a number of embodiments of the present disclosure. The sensing circuitry 450 can correspond to sensing circuitry 150 shown in FIG. 1.

A memory cell can include a storage element (e.g., capacitor) and an access device (e.g., transistor). For instance, a first memory cell can include transistor 402-1 and capacitor 403-1, and a second memory cell can include transistor 402-2 and capacitor 403-2, etc. In this embodiment, the memory array 430 is a DRAM array of 1T1C (one transistor one capacitor) memory cells, although other embodiments of configurations can be used (e.g., 2T2C with two transistors and two capacitors per memory cell). In a number of embodiments, the memory cells may be destructive read memory cells (e.g., reading the data stored in the cell destroys the data such that the data originally stored in the cell is refreshed after being read).

Figure 5:
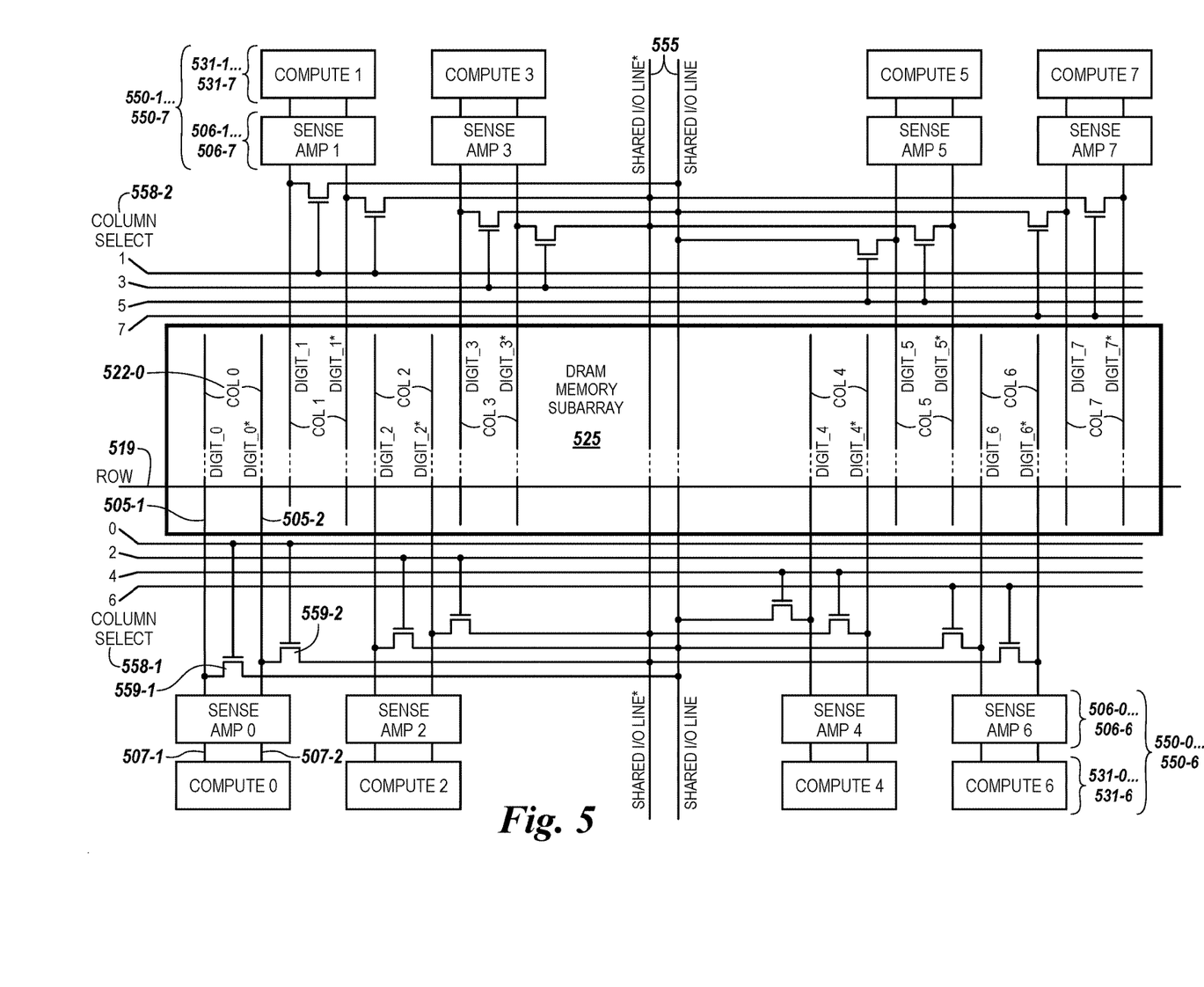
FIG. 5 is a schematic diagram illustrating circuitry for data transfer in a memory device in accordance with a number of embodiments of the present disclosure.

The cells of the memory array 430 can be arranged in rows coupled by access (word) lines 404-X (Row X), 404-Y (Row Y), etc., and columns coupled by pairs of complementary sense lines (e.g., digit lines DIGIT(D) and DIGIT (D) shown in FIG. 4 and DIGIT_0 and DIGIT_0* shown in FIG. 5). The individual sense lines corresponding to each pair of complementary sense lines can also be referred to as digit lines 405-1 for DIGIT (D) and 405-2 for DIGIT (D)_, respectively, or corresponding reference numbers in FIG. 5. Although only one pair of complementary digit lines are shown in FIG. 4, embodiments of the present disclosure are not so limited, and an array of memory cells can include additional columns of memory cells and digit lines (e.g., 4,096, 8,192, 16,384, etc.).

Although rows and columns are illustrated as orthogonally oriented in a plane, embodiments are not so limited. For example, the rows and columns may be oriented relative to each other in any feasible three-dimensional configuration. For example, the rows and columns may be oriented at any angle relative to each other, may be oriented in a substantially horizontal plane or a substantially vertical plane, and/or may be oriented in a folded topology, among other possible three-dimensional configurations.

Memory cells can be coupled to different digit lines and word lines. For example, a first source/drain region of a transistor 402-1 can be coupled to digit line 405-1 (D), a second source/drain region of transistor 402-1 can be coupled to capacitor 403-1, and a gate of a transistor 402-1 can be coupled to word line 404-Y. A first source/drain region of a transistor 402-2 can be coupled to digit line 405-2 (D)_, a second source/drain region of transistor 402-2 can be coupled to capacitor 403-2, and a gate of a transistor 402-2 can be coupled to word line 404-X. A cell plate, as shown in FIG. 4, can be coupled to each of capacitors 403-1 and 403-2. The cell plate can be a common node to which a reference voltage (e.g., ground) can be applied in various memory array configurations.

The memory array 430 is configured to couple to sensing circuitry 450 in accordance with a number of embodiments of the present disclosure. In this embodiment, the sensing circuitry 450 comprises a sense amplifier 406 and a compute component 431 corresponding to respective columns of memory cells (e.g., coupled to respective pairs of complementary digit lines). The sense amplifier 406 can be coupled to the pair of complementary digit lines 405-1 and 405-2. The compute component 431 can be coupled to the sense amplifier 406 via pass gates 407-1 and 407-2. The gates of the pass gates 407-1 and 407-2 can be coupled to operation selection logic 413.

The operation selection logic 413 can be configured to include pass gate logic for controlling pass gates that couple the pair of complementary digit lines un-transposed between the sense amplifier 406 and the compute component 431 and swap gate logic for controlling swap gates that couple the pair of complementary digit lines transposed between the sense amplifier 406 and the compute component 431. The operation selection logic 413 can also be coupled to the pair of complementary digit lines 405-1 and 405-2. The operation selection logic 413 can be configured to control continuity of pass gates 407-1 and 407-2 based on a selected operation.

The sense amplifier 406 can be operated to determine a data value (e.g., logic state) stored in a selected memory cell. The sense amplifier 406 can comprise a cross coupled latch, which can be referred to herein as a primary latch. In the example illustrated in FIG. 4, the circuitry corresponding to sense amplifier 406 comprises a latch 415 including four transistors coupled to a pair of complementary digit lines D 405-1 and (D)_ 405-2. However, embodiments are not limited to this example. The latch 415 can be a cross coupled latch (e.g., gates of a pair of transistors) such as n-channel transistors (e.g., NMOS transistors) 427-1 and 427-2 are cross coupled with the gates of another pair of transistors, such as p-channel transistors (e.g., PMOS transistors) 429-1 and 429-2).

In operation, when a memory cell is being sensed (e.g., read), the voltage on one of the digit lines 405-1 (D) or 405-2 (D)_ will be slightly greater than the voltage on the other one of digit lines 405-1 (D) or 405-2 (D)_. An ACT signal and an RNL* signal can be driven low to enable (e.g., fire) the sense amplifier 406. The digit lines 405-1 (D) or 405-2 (D)_ having the lower voltage will turn on one of the PMOS transistor 429-1 or 429-2 to a greater extent than the other of PMOS transistor 429-1 or 429-2, thereby driving high the digit line 405-1 (D) or 405-2 (D)_ having the higher voltage to a greater extent than the other digit line 405-1 (D) or 405-2 (D)_ is driven high.

Similarly, the digit line 405-1 (D) or 405-2 (D)_ having the higher voltage will turn on one of the NMOS transistor 427-1 or 427-2 to a greater extent than the other of the NMOS transistor 427-1 or 427-2, thereby driving low the digit line 405-1 (D) or 405-2 (D)_ having the lower voltage to a greater extent than the other digit line 405-1 (D) or 405-2 (D)_ is driven low. As a result, after a short delay, the digit line 405-1 (D) or 405-2 (D)_ having the slightly greater voltage is driven to the voltage of the supply voltage $V_{CC}$ through a source transistor, and the other digit line 405-1 (D) or 405-2 (D)_ is driven to the voltage of the reference voltage (e.g., ground) through a sink transistor. Therefore, the cross coupled NMOS transistors 427-1 and 427-2 and PMOS transistors 429-1 and 429-2 serve as a sense amplifier pair, which amplify the differential voltage on the digit lines 405-1 (D) and 405-2 (D)_ and operate to latch a data value sensed from the selected memory cell.

Embodiments are not limited to the sense amplifier 406 configuration illustrated in FIG. 4. As an example, the sense amplifier 406 can be a current-mode sense amplifier and a single-ended sense amplifier (e.g., sense amplifier coupled to one digit line). Also, embodiments of the present disclosure are not limited to a folded digit line architecture such as that shown in FIG. 4.

The sense amplifier 406 can, in conjunction with the compute component 431, be operated to perform various operations using data from an array as input. In a number of embodiments, the result of an operation can be stored back to the array without transferring the data via a digit line address access and/or moved between banks without using an external data bus (e.g., without firing a column decode signal such that data is transferred to circuitry external from the array and sensing circuitry via local I/O lines). As such, a number of embodiments of the present disclosure can enable performing operations and compute functions associated therewith using less power than various previous approaches. Additionally, since a number of embodiments eliminate the need to transfer data across local and global I/O lines and/or external data buses in order to perform compute functions (e.g., between memory and discrete processor), a number of embodiments can enable an increased (e.g., faster) processing capability as compared to previous approaches.

The sense amplifier 406 can further include equilibration circuitry 414, which can be configured to equilibrate the digit lines 405-1 (D) and 405-2 (D)_. In this example, the equilibration circuitry 414 comprises a transistor 424 coupled between digit lines 405-1 (D) and 405-2 (D)_. The equilibration circuitry 414 also comprises transistors 425-1 and 425-2 each having a first source/drain region coupled to an equilibration voltage (e.g., $V_{DD}/2$), where $V_{DD}$ is a supply voltage associated with the array. A second source/drain region of transistor 425-1 can be coupled digit line 405-1 (D), and a second source/drain region of transistor 425-2 can be coupled digit line 405-2 (D)_. Gates of transistors 424, 425-1, and 425-2 can be coupled together, and to an equilibration (EQ) control signal line 426. As such, activating EQ enables the transistors 424, 425-1, and 425-2, which effectively shorts digit lines 405-1 (D) and 405-2 (D)_ together and to the equilibration voltage (e.g., $V_{DD}/2$).

Although FIG. 4 shows sense amplifier 406 comprising the equilibration circuitry 414, embodiments are not so limited, and the equilibration circuitry 414 may be implemented discretely from the sense amplifier 406, implemented in a different configuration than that shown in FIG. 4, or not implemented at all.

As described further below, in a number of embodiments, the sensing circuitry 450 (e.g., sense amplifier 406 and compute component 431) can be operated to perform a selected operation and initially store the result in one of the sense amplifier 406 or the compute component 431 without transferring data from the sensing circuitry via a local or global I/O line and/or moved between banks without using an external data bus (e.g., without performing a sense line address access via activation of a column decode signal, for instance).

Performance of operations (e.g., Boolean logical operations involving data values) is fundamental and commonly used. Boolean logical operations are used in many higher level operations. Consequently, speed and/or power efficiencies that can be realized with improved operations, can translate into speed and/or power efficiencies of higher order functionalities.

As shown in FIG. 4, the compute component 431 can also comprise a latch, which can be referred to herein as a secondary latch 464. The secondary latch 464 can be configured and operated in a manner similar to that described above with respect to the primary latch 415, with the exception that the pair of cross coupled p-channel transistors (e.g., PMOS transistors) included in the secondary latch can have their respective sources coupled to a supply voltage (e.g., $V_{DD}$), and the pair of cross coupled n-channel transistors (e.g., NMOS transistors) of the secondary latch can have their respective sources selectively coupled to a reference voltage (e.g., ground), such that the secondary latch is continuously enabled. The configuration of the compute component 431 is not limited to that shown in FIG. 4, and various other embodiments are feasible.

As described herein, a memory device (e.g., 101 in FIG. 1) can be configured to couple to a host (e.g., 110) via a data bus (e.g., 156) and a control bus (e.g., 154). A bank (e.g., bank 321-1 in FIG. 3) in the memory device can include a plurality of subarrays of memory cells. The bank can include sensing circuitry (e.g., 150 in FIG. 1 and corresponding reference numbers 450 in FIGS. 4 and 550 in FIG. 5) coupled to the plurality of subarrays via a plurality of columns (e.g., 522 in FIG. 5) of the memory cells. The sensing circuitry can include a sense amplifier and a compute component (e.g., 406 and 431, respectively, in FIG. 4) coupled to each of the columns.

The bank can include a plurality of sensing stripes (e.g., 350/370 in FIG. 3) each with sensing circuitry coupled to a respective subarray of the plurality of the subarrays. A controller (e.g., 140 in FIG. 1) coupled to the bank can be configured to direct, as described herein, movement of data values stored in a first subarray (e.g., from data values in a row of the subarray sensed (cached) by the coupled sensing stripe) to be stored in latches of a latch stripe and/or a latch component. Moving (e.g., copying, transferring, and/or transporting) data values between sense amplifiers and/or compute components (e.g., 406 and 431, respectively, in FIG. 4) in a sensing stripe and corresponding sense amplifiers and/or compute components that form latches in a latch stripe can be enabled by a number of selectably coupled shared I/O lines (e.g., 355 in FIG. 3) shared by the sensing component stripe and the latch stripe, as described herein.

The memory device can include a sensing stripe configured to include a number of a plurality of sense amplifiers and compute components (e.g., 506-0, 506-1, . . . , 506-7 and 531-0, 531-1, . . . , 331-7, respectively, as shown in FIG. 5) that can correspond to a number of the plurality of columns (e.g., 522 in FIGS. 5 and 405-1 and 405-2 in FIG. 4) of the memory cells, where the number of sense amplifiers and/or compute components can be selectably coupled to the plurality of shared I/O lines (e.g., via column select circuitry 558-1 and 558-2). The column select circuitry can be configured to selectably sense data in a particular column of memory cells of a subarray by being selectably coupled to a plurality of (e.g., four, eight, and sixteen, among other possibilities) sense amplifiers and/or compute components.

In some embodiments, a number of a plurality of sensing stripes (e.g., 350/370 in FIG. 3) in the bank can correspond to a number of the plurality of subarrays in the bank. A sensing stripe can include a number of sense amplifiers and/or compute components configured to move (e.g., copy, transfer, and/or transport) an amount of data sensed from a row of the first subarray in parallel to a plurality of shared I/O lines. In some embodiments, the amount of data can correspond to at least a thousand bit width of the plurality of shared I/O lines.

As described herein, the array of memory cells can include an implementation of DRAM memory cells where the controller is configured, in response to a command, to move (e.g., copy, transfer, and/or transport) data from the source location to the destination location via a shared I/O line. In various embodiments, the source location can be in a first bank and the destination location can be in a second bank in the memory device and/or the source location can be in a first subarray of one bank in the memory device and the destination location can be in a second subarray of a different bank. According to embodiments, the data can be moved as described in connection with FIG. 1. The first subarray and the second subarray can be in the same section of the bank or the subarrays can be in different sections of the bank.

As described herein, the apparatus can be configured to move (e.g., copy, transfer, and/or transport) data from a source location, including a particular row (e.g., 519 in FIG. 5) and column address associated with a first number of sense amplifiers and compute components) to a shared I/O line. In addition, the apparatus can be configured to move the data to a destination location, including a particular row and column address associated with a second number of sense amplifiers and compute components. As the reader will appreciate, each shared I/O line (e.g., 555) can actually include a complementary pair of shared I/O lines (e.g., shared I/O line and shared I/O line* as shown in the example configuration of FIG. 4). In some embodiments described herein, 2048 shared I/O lines (e.g., complementary pairs of shared I/O lines) can be configured as a 2048 bit wide shared I/O line.

FIG. 5 is a schematic diagram illustrating circuitry for data transfer in a memory device in accordance with a number of embodiments of the present disclosure. FIG. 5 shows eight sense amplifiers (e.g., sense amplifiers 0, 1, . . . , 7 shown at 506-0, 506-1, . . . , 506-7, respectively) each coupled to a respective pair of complementary sense lines (e.g., digit lines 505-1 and 505-2). FIG. 5 also shows eight compute components (e.g., compute components 0, 1, . . . , 7 shown at 531-0, 531-1, . . . , 531-7) each coupled to a respective sense amplifier (e.g., as shown for sense amplifier 0 at 506-0) via respective pass gates 507-1 and 507-2 and digit lines 505-1 and 505-2. For example, the pass gates can be connected as shown in FIG. 4 and can be controlled by an operation selection signal, Pass. For example, an output of the selection logic can be coupled to the gates of the pass gates 507-1 and 507-2 and digit lines 505-1 and 505-2. Corresponding pairs of the sense amplifiers and compute components can contribute to formation of the sensing circuitry indicated at 550-0, 550-1, . . . , 550-7.

Data values present on the pair of complementary digit lines 505-1 and 505-2 can be loaded into the compute component 531-0 as described in connection with FIG. 4. For example, when the pass gates 507-1 and 507-2 are enabled, data values on the pair of complementary digit lines 505-1 and 505-2 can be passed from the sense amplifiers to the compute component (e.g., 506-0 to 531-0). The data values on the pair of complementary digit lines 505-1 and 505-2 can be the data value stored in the sense amplifier 506-0 when the sense amplifier is fired.

The sense amplifiers 506-0, 506-1, . . . , 506-7 in FIG. 5 can each correspond to sense amplifier 406 shown in FIG. 4. The compute components 531-0, 531-1, . . . , 531-7 shown in FIG. 5 can each correspond to compute component 431 shown in FIG. 4. A combination of one sense amplifier with one compute component can contribute to the sensing circuitry (e.g., 550-0, 550-1, . . . , 550-7) of a portion of a DRAM memory subarray 525 configured to an I/O line 555 shared by a number of sensing component stripes for subarrays and/or latch components, as described herein. The paired combinations of the sense amplifiers 506-0, 506-1, . . . , 506-7 and the compute components 531-0, 531-1, . . . , 531-7, shown in FIG. 5, can be included in the sensing stripes, as shown at 350/370-1 in FIG. 3.

The configurations of embodiments illustrated in FIG. 5 are shown for purposes of clarity and are not limited to these configurations. For instance, the configuration illustrated in FIG. 5 for the sense amplifiers 506-0, 506-1, . . . , 506-7 in combination with the compute components 531-0, 531-1, . . . , 531-7 and the shared I/O line 555 is not limited to half the combination of the sense amplifiers 506-0, 506-1, . . . , 506-7 with the compute components 531-0, 531-1, . . . , 531-7 of the sensing circuitry being formed above the columns 522 of memory cells (not shown) and half being formed below the columns 522 of memory cells. Nor are the number of such combinations of the sense amplifiers with the compute components forming the sensing circuitry configured to couple to a shared I/O line limited to eight. In addition, the configuration of the shared I/O line 555 is not limited to being split into two for separately coupling each of the two sets of complementary digit lines 505-1 and 505-2, nor is the positioning of the shared I/O line 555 limited to being in the middle of the combination of the sense amplifiers and the compute components forming the sensing circuitry (e.g., rather than being at either end of the combination of the sense amplifiers and the compute components).

The circuitry illustrated in FIG. 5 also shows column select circuitry 558-1 and 558-2 that is configured to implement data movement operations with respect to particular columns 522 of a subarray 525, the complementary digit lines 505-1 and 505-2 associated therewith, and the shared I/O line 555 (e.g., as directed by the controller 140 shown in FIG. 1). For example, column select circuitry 558-1 has select lines 0, 2, 4, and 6 that are configured to couple with corresponding columns, such as column 0 (532-0), column 2, column 4, and column 6. Column select circuitry 558-2 has select lines 1, 3, 5, and 7 that are configured to couple with corresponding columns, such as column 1, column 3, column 5, and column 7.

Controller 140 can be coupled to column select circuitry 558 to control select lines (e.g., select line 0) to access data values stored in the sense amplifiers, compute components, and/or present on the pair of complementary digit lines (e.g., 505-1 and 505-2 when selection transistors 559-1 and 559-2 are activated via signals from select line 0). Activating the selection transistors 559-1 and 559-2 (e.g., as directed by the controller 140) enables coupling of sense amplifier 506-0, compute component 531-0, and/or complementary digit lines 505-1 and 505-2 of column 0 (522-0) to move data values on digit line 0 and digit line 0* to shared I/O line 555. For example, the moved data values may be data values from a particular row 519 stored (cached) in sense amplifier 506-0 and/or compute component 531-0. Data values from each of columns 0 through 7 can similarly be selected by controller 140 activating the appropriate selection transistors.

Moreover, enabling (e.g., activating) the selection transistors (e.g., selection transistors 559-1 and 559-2) can enable a particular sense amplifier and/or compute component (e.g., 506-0 and/or 531-0, respectively) to be coupled with a shared I/O line 555 such that data values stored by an amplifier and/or compute component can be moved to (e.g., placed on and/or transferred to) the shared I/O line 555. In some embodiments, one column at a time is selected (e.g., column 522-0) to be coupled to a particular shared I/O line 555 to move (e.g., copy, transfer, and/or transport) the stored data values. In the example configuration of FIG. 5, the shared I/O line 355 is illustrated as a shared, differential I/O line pair (e.g., shared I/O line and shared I/O line*). Hence, selection of column 0 (522-0) could yield two data values (e.g., two bits with values of 0 and/or 1) from a row (e.g., row 519) and/or as stored in the sense amplifier and/or compute component associated with complementary digit lines 505-1 and 505-2. These data values could be input in parallel to each shared, differential I/O pair (e.g., shared I/O and shared I/O*) of the shared differential I/O line 555.

While example embodiments including various combinations and configurations of sensing circuitry, sense amplifiers, compute component, dynamic latches, isolation devices, and/or shift circuitry have been illustrated and described herein, embodiments of the present disclosure are not limited to those combinations explicitly recited herein. Other combinations and configurations of the sensing circuitry, sense amplifiers, compute component, dynamic latches, isolation devices, and/or shift circuitry disclosed herein are expressly included within the scope of this disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an array of volatile memory cells;
sensing circuitry comprising a plurality of sense amplifiers each coupled to the array; and
a compute component coupled to at least one of the plurality of sense amplifiers;
a shared input/output (I/O) line shared by each of the plurality of sense amplifiers;
a cache coupled to the array;
tracking circuitry coupled to the cache,
a controller coupled to the cache and configured to:
send a command for copying cache data from the cache to the array, the command having an associated column address; and
transfer data from the shared I/O line to the compute component and selectably transfer data from the plurality of sense amplifiers to a portion of the array corresponding to a number of columns of memory cells to move corresponding data values by the sensing circuitry to the shared I/O line;
a command interface coupled to the cache and to at least one of the plurality of subarrays and configured to provide commands to the cache along with corresponding column addresses and updated data received through the shared I/O line and to be written to the cache, wherein the updated data in the cache comprises a result of executing Boolean operations using the sensing circuitry coupled to the array;
wherein the tracking circuitry comprises latch circuitry and compare logic and is configured to:
track each of the column addresses associated with the updated data received to the cache via the command interface, wherein the column addresses are latched in the latch circuitry; and
compare the column address of the command for copying cache data from the cache to the array to the tracked addresses associated with the updated data received to the cache via the command interface; and, wherein the compare logic is configured to receive and compare:
the column address of the command; and
the column addresses tracked in the latch circuitry;
wherein the controller is further configured to:
cause a flag associated with a column address received to the cache via the command interface to be set in response to the updated data corresponding to the column address being written to the cache; and
writing of data that includes a set flag and not writing data that does not include a set flag.

2. The apparatus of claim 1, wherein the tracking circuitry comprises a latch to store a data value that indicates the flag is set.

3. The apparatus of claim 1, wherein the tracking circuitry is configured to:
set a flag associated with a first column address in response to updated data associated with the first column address being written to the cache; and
not set a flag associated with a second column address in response to data associated with the second column address not being written to the cache.

4. The apparatus of claim 1, wherein the controller is a DDR4 SDRAM controller.

5. The apparatus of claim 1, wherein the tracking circuitry is configured to latch a data value that corresponds to a column address associated with at least one of the write commands.

6. A method, comprising:
writing data stored in an array of memory cells to a cache, wherein:
the cache comprises latch circuitry and compare logic; and
the data is transferred via a shared input/output (I/O) line coupled to each of a plurality of sense amplifiers coupled to the array and via a compute component coupled to at least one of the plurality of sense amplifiers;
in response to a command being sent via a command interface to update a portion of the data associated with column addresses and stored in the cache:
modifying the portion of the data associated with the command, wherein the updated portion of the data comprises a result of executing Boolean operations using sensing circuitry coupled to the array; and tracking column addresses associated with the updated portion of the data on a column address by column address basis by latching the column addresses in the latch circuitry;

in response to receiving a write command, from a controller, to copy at least the updated portion of data from the cache to the array, comparing, in the compare logic, the column addresses associated with the sent command with the latched column addresses; and in response to at least one of the column addresses matching with at least one of the latched column addresses, writing the updated portion of the data associated with each of the matched column addresses to the array and not writing portions of the data associated with column addresses that do not match.

7. The method of claim 6, comprising not writing a non-updated portion of the data in the cache to the memory.

8. The method of claim 7, comprising masking a portion of the data in the cache that is not updated.

9. The method of claim 8, wherein masking the portion of the data comprises blocking activation of the column selects associated with the portion.

10. The method of claim 8, wherein masking the portion of the data comprises disabling write data drivers associated with the portion.

11. An apparatus, comprising:
an array of memory cells;
sensing circuitry comprising a plurality of sense amplifiers each coupled to the array; and
a compute component coupled to at least one of the plurality of sense amplifiers;
a shared input/output (I/O) line shared by each of the plurality of sense amplifiers;
a cache coupled to the array and comprising tracking circuitry;
a command interface coupled to the cache and configured to:
  transfer data from the shared I/O line to the compute component and selectably transfer data from the plurality of sense amplifiers to a portion of the array corresponding to column addresses; and
  provide write commands to the cache along with the corresponding column addresses and update a portion of data of the cache, wherein the updated portion of data comprises a result of executing Boolean operations using sensing circuitry coupled to the array;
wherein the tracking circuitry comprises latch circuitry and compare logic and is configured to:
  track the column addresses associated with the updated portion of data received to the cache via the command interface by latching the column addresses in the latch circuitry;
  in response to receiving a command from a controller to write at least the updated portion of data associated with a column address from the cache to the array, wherein corresponding column addresses are received along with the command, compare, in the compare logic, the column address of the command for writing at least the updated portion of data to the tracked addresses received to the cache via the command interface; and
  in response to the compare matching the column address and one of the tracked addresses, writing data associated with the each of the matched column addresses from the cache to the array and not writing data associated with a column address that does not match a tracked address of the tracked addresses.

12. The apparatus of claim 11, wherein the tracking circuitry comprises logic circuitry and a plurality of latches.

13. The apparatus of claim 12, wherein the logic circuitry is configured to enable a write of the portion of the data to the array.

14. The apparatus of claim 12, wherein the tracking circuitry is configured to store a particular value in a latch associated with a column address of the portion of data.

15. The apparatus of claim 12, comprising a controller configured to initiate a write operation of data stored in the cache to be written to the array.

16. The apparatus of claim 15, wherein, in response to the controller initiating the write operation, the cache is configured to write the updated portion of the data to the array.

17. The apparatus of claim 11, wherein the command interface is a DRAM command interface.

18. The apparatus of claim 11, wherein the cache is coupled to a plurality of input/output (I/O) lines configured to receive update data from additional arrays.

19. The apparatus of claim 11, wherein the cache is coupled to a plurality of input/output (I/O) lines configured to receive data from an external host.

20. A method, comprising:
receiving write commands via a command interface indicating to write data stored in an array of memory cells to a cache, wherein:
  corresponding column addresses are received with the write commands; and
  the data is transferred via a shared input/output (I/O) line coupled to each of a plurality of sense amplifiers coupled to the array and via a compute component coupled to at least one of the plurality of sense amplifiers;
receiving additional write commands via the command interface to update a portion of the data stored to the cache, wherein the updated portion of data comprises a result of executing Boolean operations using sensing circuitry coupled to the array;
tracking the column addresses associated with the additional write commands associated with the updated portion of the data via the command interface by latching the column addresses in latching circuitry of the cache;
writing the updated portion of the data associated with each of the tracked column addresses to the cache in response to the additional write commands;
in response to receiving a command, from a controller, to write the data from the cache to the array, the command having associated column addresses, comparing, in compare logic of the cache, the tracked column addresses associated with the additional write commands received to the cache via the command interface; and
in response to at least one of the column addresses received to the cache via the command to write at least the data from the cache to the array matching with at least one of the tracked column addresses of the command, writing data associated with the matched column addresses to the array via the plurality of sense amplifiers and the compute component and not writing data associated with column addresses that do not match.

21. The method of claim 20, comprising latching a value in response to receiving a write command associated with a column address.

22. The method of claim 21, wherein the writing of the data associated with the tracked column addresses comprises writing data associated with the latched values to the array.

23. The method of claim 22, comprising clearing the latched values in response to the writing of the data associated with the tracked column addresses to the array.

* * * * *